(12) United States Patent
Sivinski et al.

(10) Patent No.: US 10,251,330 B2
(45) Date of Patent: Apr. 9, 2019

(54) LATCH ASSEMBLY FOR A FOLDING TOOLBAR WING

(71) Applicant: Harvest International, Inc., Storm Lake, IA (US)

(72) Inventors: Jeffrey Alan Sivinski, Cherokee, IA (US); Byron J. Friesen, Storm Lake, IA (US)

(73) Assignee: Harvest International, Inc., Storm Lake, IA (US)

( * ) Notice: Subject to any disclaimer, the term of this patent is extended or adjusted under 35 U.S.C. 154(b) by 66 days.

(21) Appl. No.: 15/266,167

(22) Filed: Sep. 15, 2016

(65) Prior Publication Data

US 2017/0071123 A1 Mar. 16, 2017

Related U.S. Application Data

(60) Provisional application No. 62/218,630, filed on Sep. 15, 2015.

(51) Int. Cl.
*A01B 73/06* (2006.01)
*A01B 76/00* (2006.01)

(52) U.S. Cl.
CPC ............ *A01B 73/065* (2013.01); *A01B 76/00* (2013.01)

(58) Field of Classification Search
CPC ................................................. A01B 73/065
USPC ........................................................ 172/311
See application file for complete search history.

(56) References Cited

U.S. PATENT DOCUMENTS

| | | | | |
|---|---|---|---|---|
| 3,620,550 A | * | 11/1971 | Hornung ............... | A01B 73/02 172/311 |
| 3,874,459 A | * | 4/1975 | Herberholz .......... | A01B 73/067 172/311 |
| 3,982,773 A | * | 9/1976 | Stufflebeam et al. ...................... | A01B 73/067 111/57 |
| 4,056,149 A | * | 11/1977 | Honnold ............... | A01B 73/067 172/311 |
| 4,137,852 A | * | 2/1979 | Pratt ...................... | A01C 7/208 111/57 |
| 4,301,873 A | * | 11/1981 | Baxter ................. | A01B 73/067 172/311 |
| 4,319,643 A | * | 3/1982 | Carter et al. ......... | A01B 73/065 172/311 |
| 4,723,787 A | * | 2/1988 | Hadley et al. ....... | A01B 73/065 172/311 |
| 6,076,613 A | * | 6/2000 | Frasier ................ | A01B 73/065 111/57 |
| 6,112,827 A | * | 9/2000 | Reiber et al. ......... | A01B 63/32 172/311 |
| 6,502,645 B1 | * | 1/2003 | Brueggen et al. ... | A01B 73/065 111/57 |

(Continued)

*Primary Examiner* — Thomas B Will
*Assistant Examiner* — Joel F. Mitchell
(74) *Attorney, Agent, or Firm* — McKee, Voorhees & Sease, PLC (57) ABSTRACT

The latch assembly for the wings of a folding tool bar includes catches on each wing wing and a pair of pivotal latch arms on the tool bar tongue. An actuator pivots the latch arms between an unlatched position disengaged from the wing catches to a latched position engaging the wing catches so as to retain the wings in a transport position. In the latching and unlatching method, the latch arms are pivoted simultaneously in opposite directions by an actuator to capture and release the opposing wings of the tool bar.

17 Claims, 11 Drawing Sheets

(56) References Cited

U.S. PATENT DOCUMENTS 7,854,272 B2 * 12/2010 Friggstad et al. ... A01B 73/065
                                                                                      172/311

* cited by examiner

LATCH ASSEMBLY FOR A FOLDING TOOLBAR WING

CROSS REFERENCE TO RELATED APPLICATIONS

This application claims priority under 35 U.S.C. § 119 to provisional application U.S. Ser. No. 62/218,630, filed on Sep. 15, 2015, herein incorporated by reference in its entirety.

BACKGROUND OF THE INVENTION

Folding toolbars are well known. Conventional folding toolbars include a longitudinally extending tongue having a transverse frame member at the rear of the tongue. A pair of wings are pivotally attached to the frame so as to fold between a use position extending laterally in opposite directions, and a transport position extending parallel and adjacent the tongue. The wings and the center frame each have wheels for rolling support in both the use and transport positions. Folding and unfolding of the wings is accomplished with hydraulic cylinders.

Typically, the wings are maintained in the transport position solely by the hydraulic system, without a mechanical lock or latch. Sometimes the hydraulic cylinders do not fully pull the wings into the transport position. Since the hydraulic cylinder is located at the inner/rearward ends of the wings, the outer/forward ends of the wings tend to have lateral movement in the transport position. Such movement creates additional forces or stress on the toolbar components and the hydraulic system, which can lead to premature wear and the need for repair or replacement.

Therefore, a primary objective of the present invention is the provision of a latch assembly for securing the wings of the toolbar in the transport position.

Another objective of the present invention is the provision of a latch assembly for a folding toolbar which can be quickly and easily actuated for engaging and disengaging the toolbar wings in the transport position.

A further objective of the present invention is the provision of a latch assembly for the wings of a folding toolbar, with the latch assembly being hydraulically actuated.

Still another objective of the present invention is the provision of a linearly actuated latch assembly for folding tool bar wings and retention of the wings in the transport position.

Yet another objective of the present invention is the provision of a pivotal latch assembly for retention of opposing wings on a folding tool bar.

Still another objective of the present invention is the provision of a latch assembly for the opposite wings of a folding tool bar which utilizes a pair of latches for retentively engaging a pair of catches on the wings of the tool bar.

Another objective of the present invention is a method of latching the wings of a folding tool bar in a transport position.

A further objective of the present invention is the provision of latching and unlatching folding tool bar wings by simultaneously pivoting a pair of latch arms to and from engagement with hooks on the wings.

Still another objective of the present invention is the provision of a method of latching and unlatching folding tool bar wings by pivoting a pair of latches in unison between latched and unlatched positions.

Yet another objective of the present invention is the provision of a method of latching and unlatching folding tool bar wings in a transport position by pivoting latch arms in opposite directions relative to one another.

A further objective of the present invention is the provision of a method of latching and unlatching opposing wings of a folding tool bar using a linear actuator.

Another objective of the present invention is the provision of a latching assembly and method for folding toolbar wings, which is quick, easy and safe to use, and economical to manufacture.

These and other objectives will become apparent from the following description of the invention.

SUMMARY OF THE INVENTION

A latch assembly is provided for a folding tool bar having a central tongue and opposite wings foldable between a lateral use position and a longitudinal transport position. The latch assembly includes a catch on each of the wings and a pair of latches mounted on the tool bar tongue. The latches extend in opposite lateral directions and are moveable between a latched position to retentively engage the catches on the wings to retain the wing in the transport position and an unlatched position disengaged from the catches to allow the wings to fold open to the use position. The latches are pivoted simultaneously, or in unison, between the latched and unlatched positions by an actuator.

A method of latching and unlatching folding tool bar wings is accomplished by folding the wings from a lateral use position to a longitudinal transport position, and then pivoting a pair of latch arms mounted on the tool bar tongue from an unlatched position disengaged from the wings to a latched position engaging catches or hooks on the wings so as to secure the wings during transport of the tool bar.

DETAILED DESCRIPTION OF THE INVENTION

Figure 1:
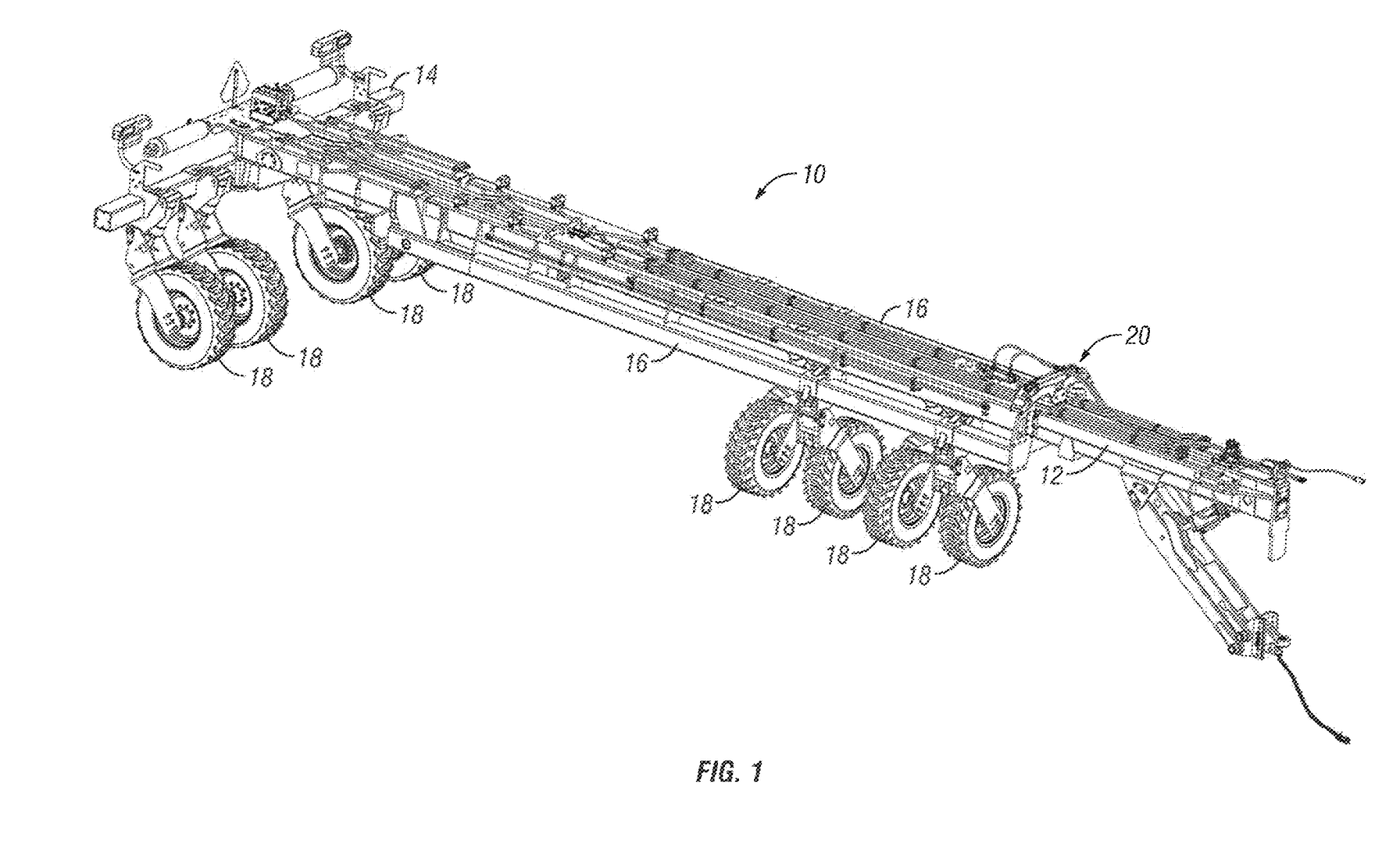
FIG. 1 is a perspective view of a toolbar having the wings folded to a transport position and having the latch assembly according to the present invention.

A folding toolbar is designated in the drawings by the reference numeral 10. The toolbar 10 includes a longitudinally extending tongue 12, with a central frame 14 extending transversely at the rear end of the tongue 12. A pair of wings 16 are pivotally mounted adjacent the center frame 14 so as to be moveable between a folded transport position parallel and adjacent to the tongue 12, as shown in FIG. 1, and an unfolded use position extending substantially perpendicular to the tongue 12. The center frame 14 and wings 16 are supported by wheels 18.

The above-described general components of the toolbar 10 are conventional, and do not constitute a part of the present invention.

The present invention is directed towards a latch assembly 20 to secure and retain the wings 16 in the folded, transport position. More particularly, the latch assembly 20 includes a pair of latch members 22 pivotally mounted on the tongue 12 for movement between a latched position engaging catches 24 mounted on the wings 16, and an unlatched position disengaged from the catches 24.

Each latch member 22 includes a first inner arm 26 having an inner end pivotally mounted between a pair of spaced apart, upright parallel plates 28 by a pin 30 which defines a first pivot axis. Each arm 26 comprises a pair of spaced apart, parallel plates 27. The arms 26 extend laterally outwards in opposite directions from the mounting plates 28. The outer end of each arm 26 is pivotally mounted to a second outer arm 32 by a pin 34 which defines a second pivot axis. Each arm 32 comprises a pair of spaced apart, parallel plates 33. The pin 34 resides between the upper inner end and lower outer end of the outer arm 32.

Pivotal movement of the latch members 22 is controlled by a linear actuator, such as a hydraulic cylinder 36 having an extendable rod 38. The hydraulic cylinder 36 is mounted to the upper or inner end of one of the arms 32 by a pin 40, while the rod 38 is pivotally mounted to the upper or inner end of the other arm 32 by a pin 42.

Each wing catch 24 includes a hook 44 which is releasably engaged by a pin 46 on the outer ends of the respective arms 32.

As seen in the drawings, the plates 27 of the arms 26, the plates 33 of the arms 32 and the mounting plate 28 are formed as a parallelogram with opposite sides and ends. However, it is understood that a different configuration for these components can also be utilized without departing from the scope of the present invention.

Figure 6:
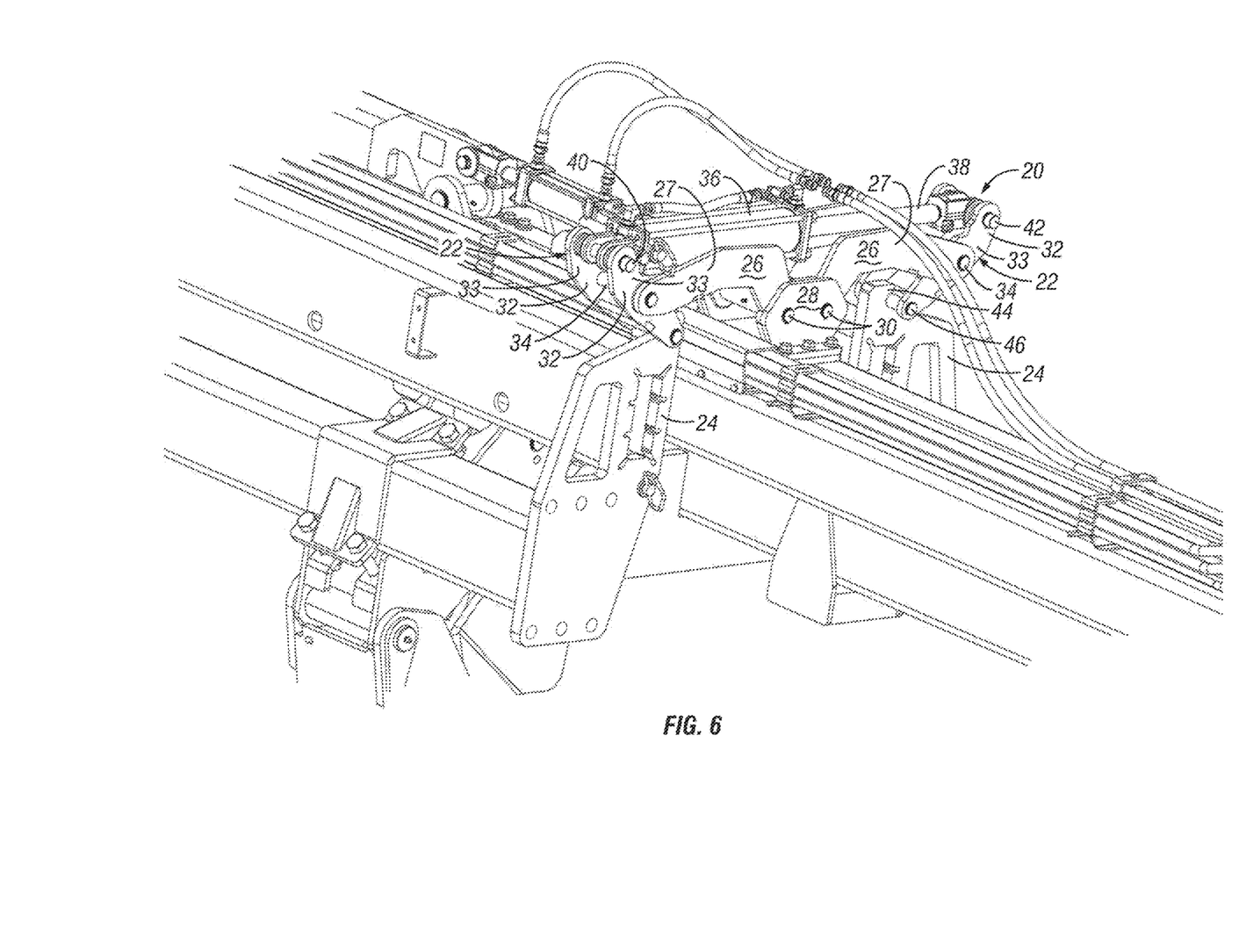
FIG. 6 is a left front perspective view of the latch assembly in a latched position.
Figure 7:
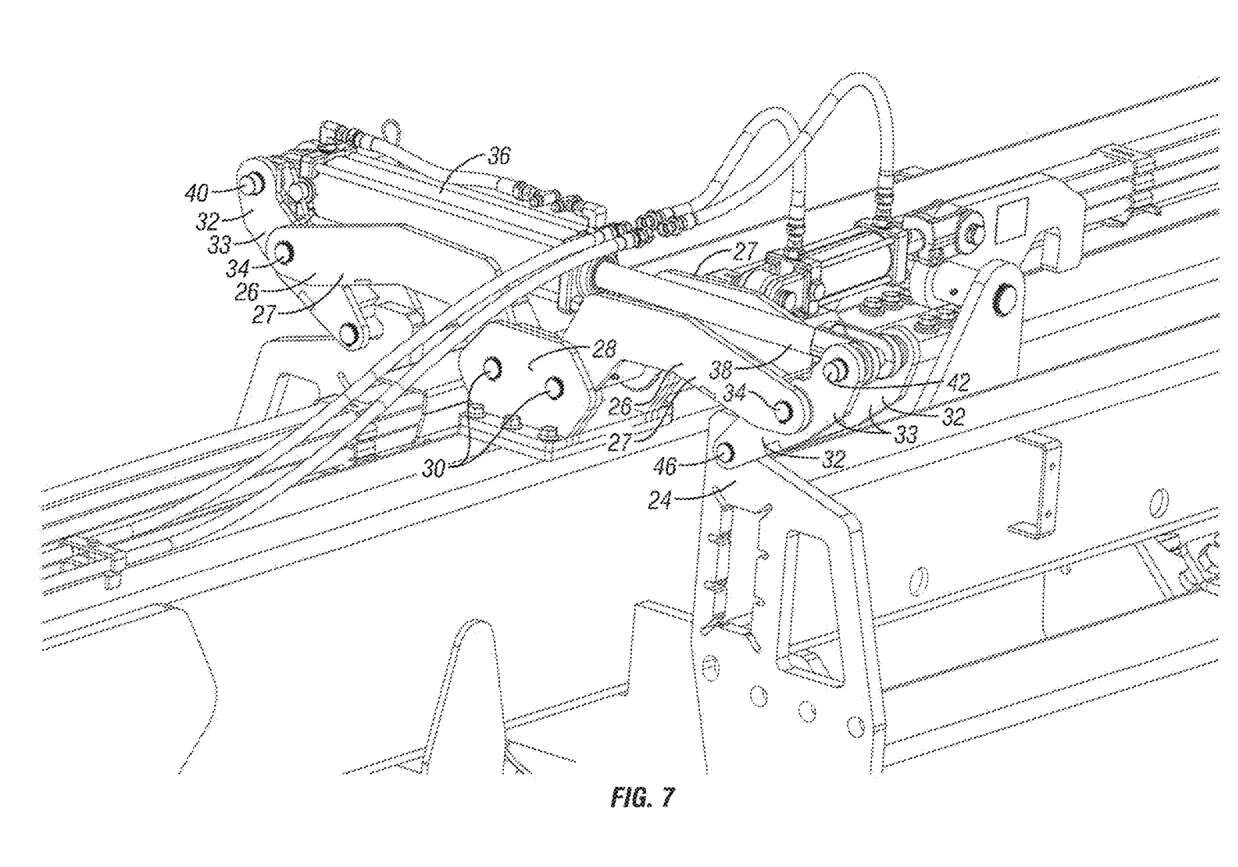
FIG. 7 is a right front perspective view of the latch assembly in a latched position.
Figure 8:
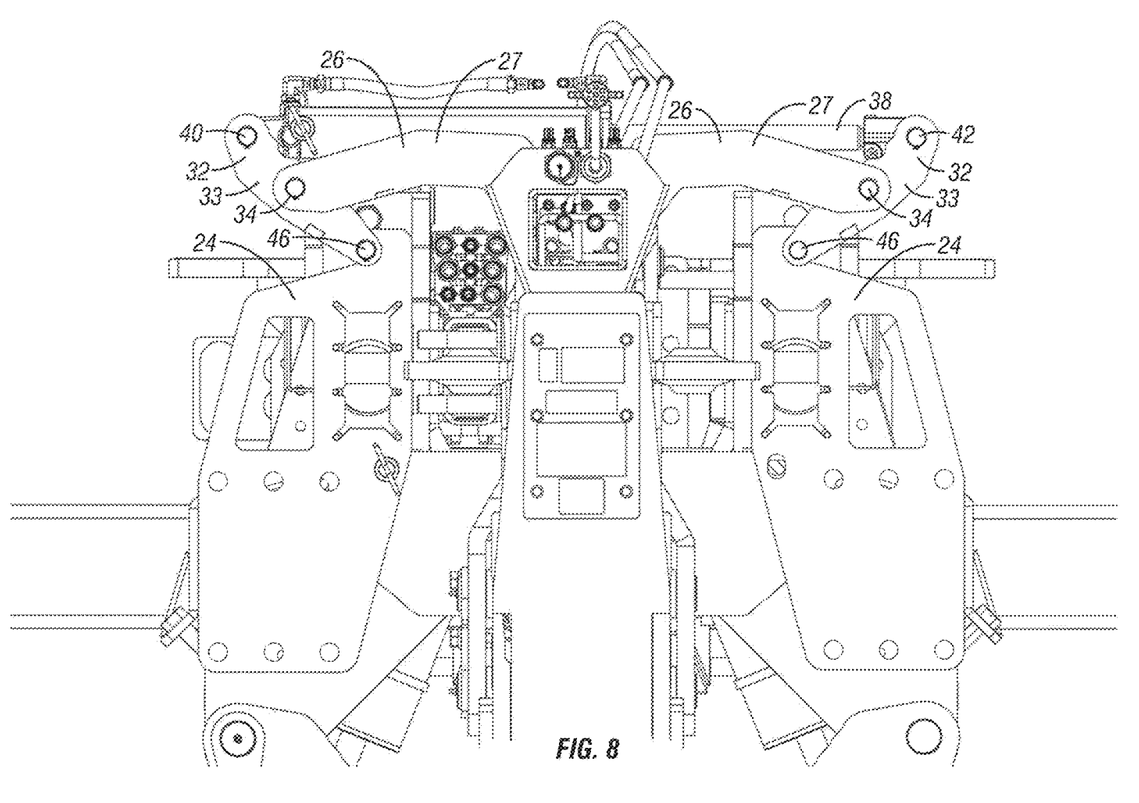
FIG. 8 is a front elevation view of the latch assembly in a latched position.

In operation, the wings 16 are folded from the extended use position to the transport position in a conventional manner. Then, the hydraulic cylinder 36 is actuated to pivot the latch members 22 from the disengaged, unlatched position shown in FIGS. 2-5 to the engaged latched position shown in FIGS. 6-8. Extension of the rod 38 pivots the outer arms 32 about the axis defined by the pins 34, such that the upper ends of the arms 32 are pushed outwardly and the outer ends of the arms 32 are moved inwardly to engage the pins 46 into the hooks 44 of the catches 24. During this latching function, the arms 32 pull the respective wings 16 inwardly adjacent the tongue 12, as the arms 32 pivot about the pins 34. The latching function of the latch assembly 20 secures the wings 16 in the transport position via the pins 46 of the latch arms 32 engaging the latch hooks 42.

To unlatch the wings 16, the hydraulic cylinder 36 is actuated to retract the rod 38 to pivot the outer arms 32 about the axis defined by the pins 34, such that the upper ends of the outer arms 32 are pulled inwardly and the pins 46 on the outer ends of the arms 32 are disengaged from the hooks 44 on the catches 24.

The latch arms 32 pivot in unison between the latched and unlatched positions. This simultaneous pivotal movement of the latch arms in opposite directions by the actuator minimizes latching and unlatching time.

As an alternative to the hydraulic cylinder 36 and rod 38, the actuator can be a telescoping rod extended and retracted by an electric motor, a threaded coupler extended and retracted by an electric motor, or other structure connected between the arms 32 to move the arms between the latched and unlatched positions.

Figure 2:
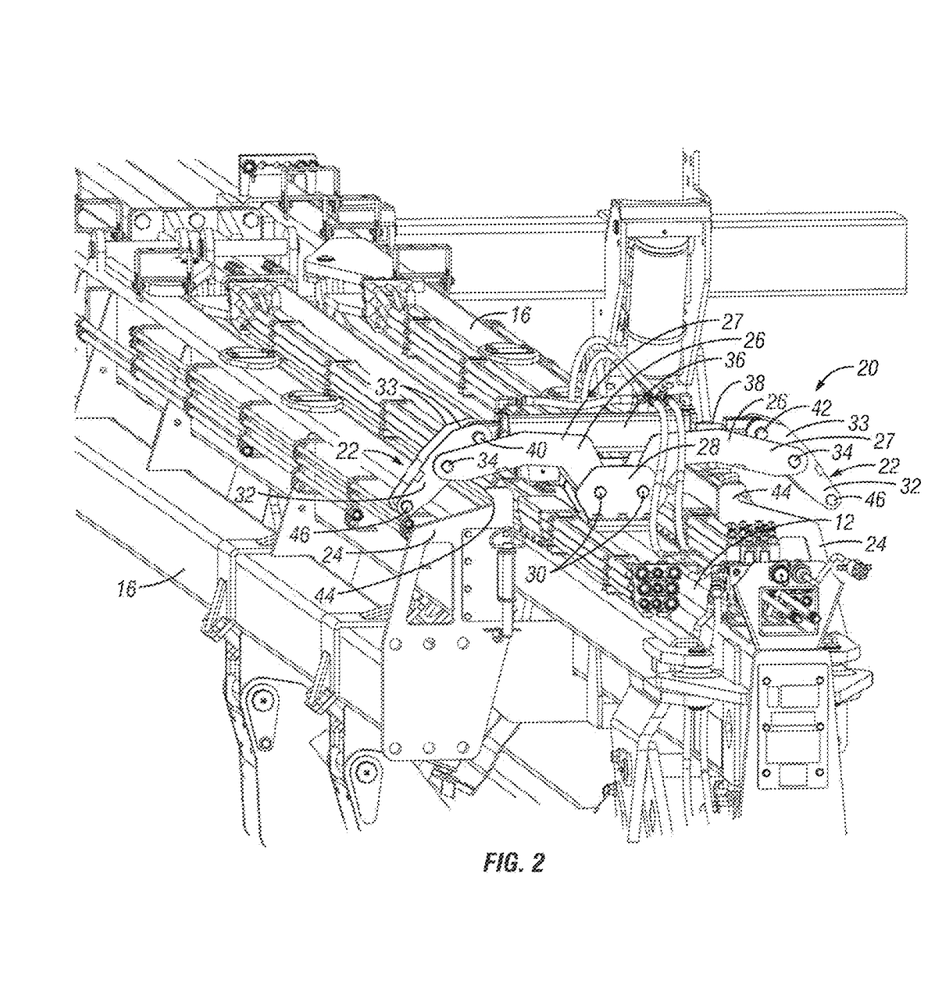
FIG. 2 is an enlarged front perspective view of the latch assembly in an unlatched position.
Figure 3:
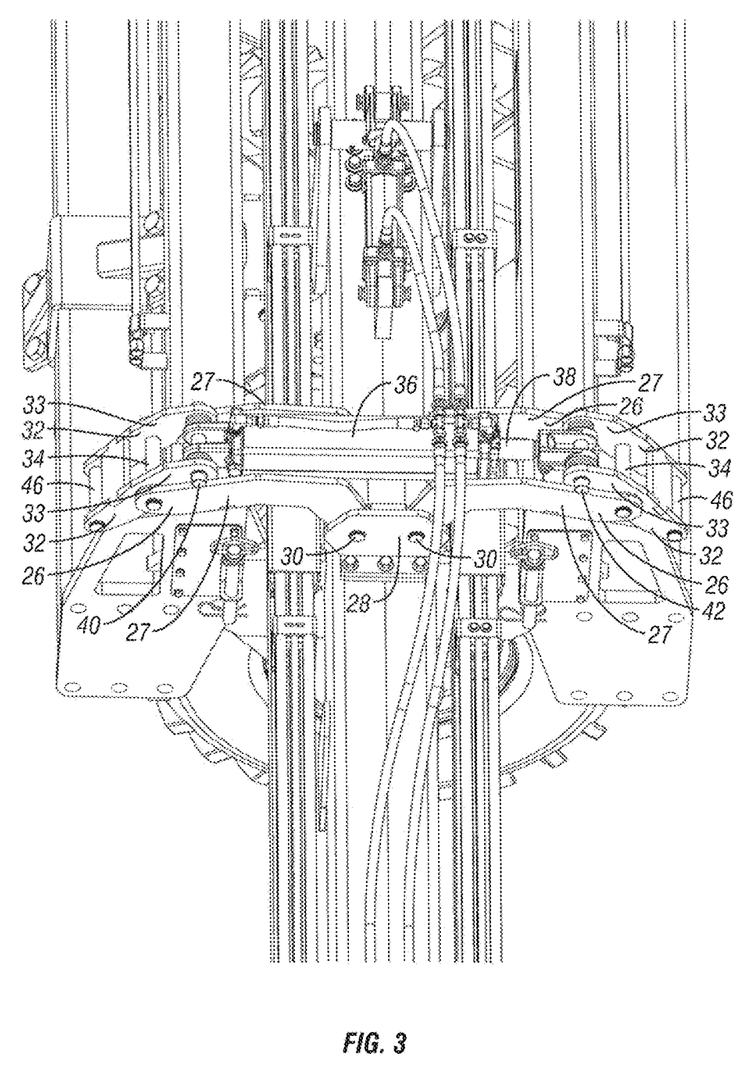
FIG. 3 is an enlarged upper perspective view of the latch assembly in an unlatched position.
Figure 4:
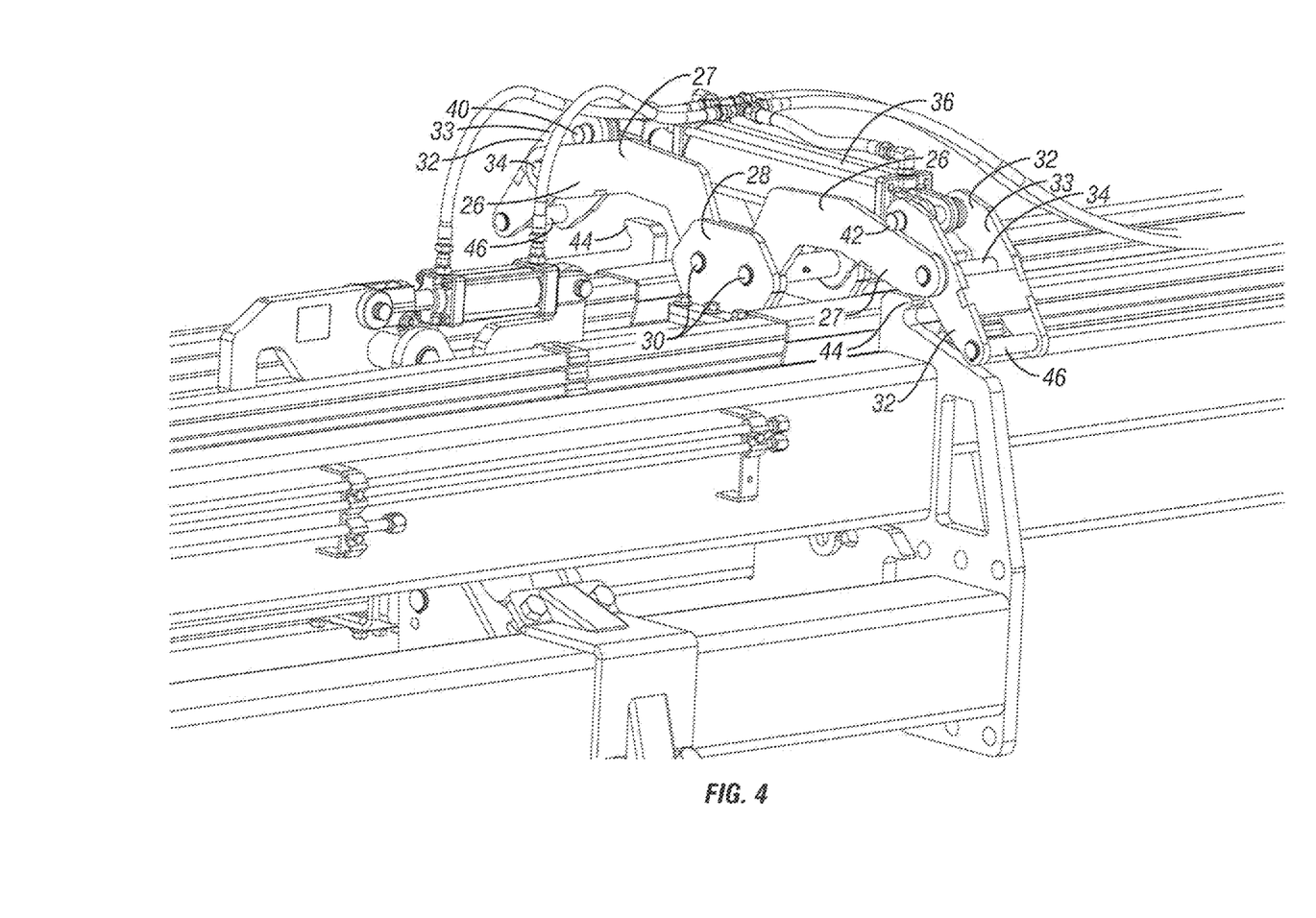
FIG. 4 is a rear perspective view of the latch assembly in an unlatched position.
Figure 5:
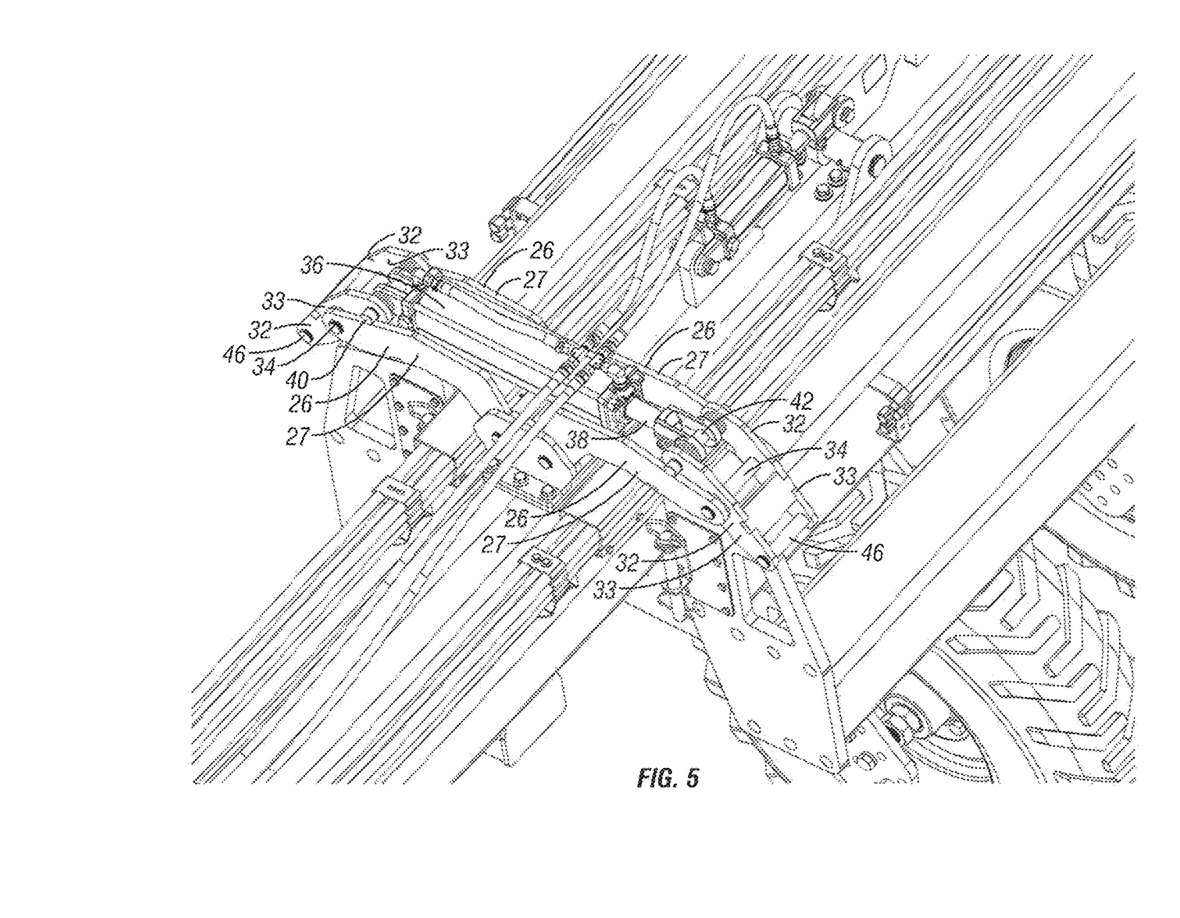
FIG. 5 is another upper perspective view of the latch assembly in an unlatched position.
Figure 9:
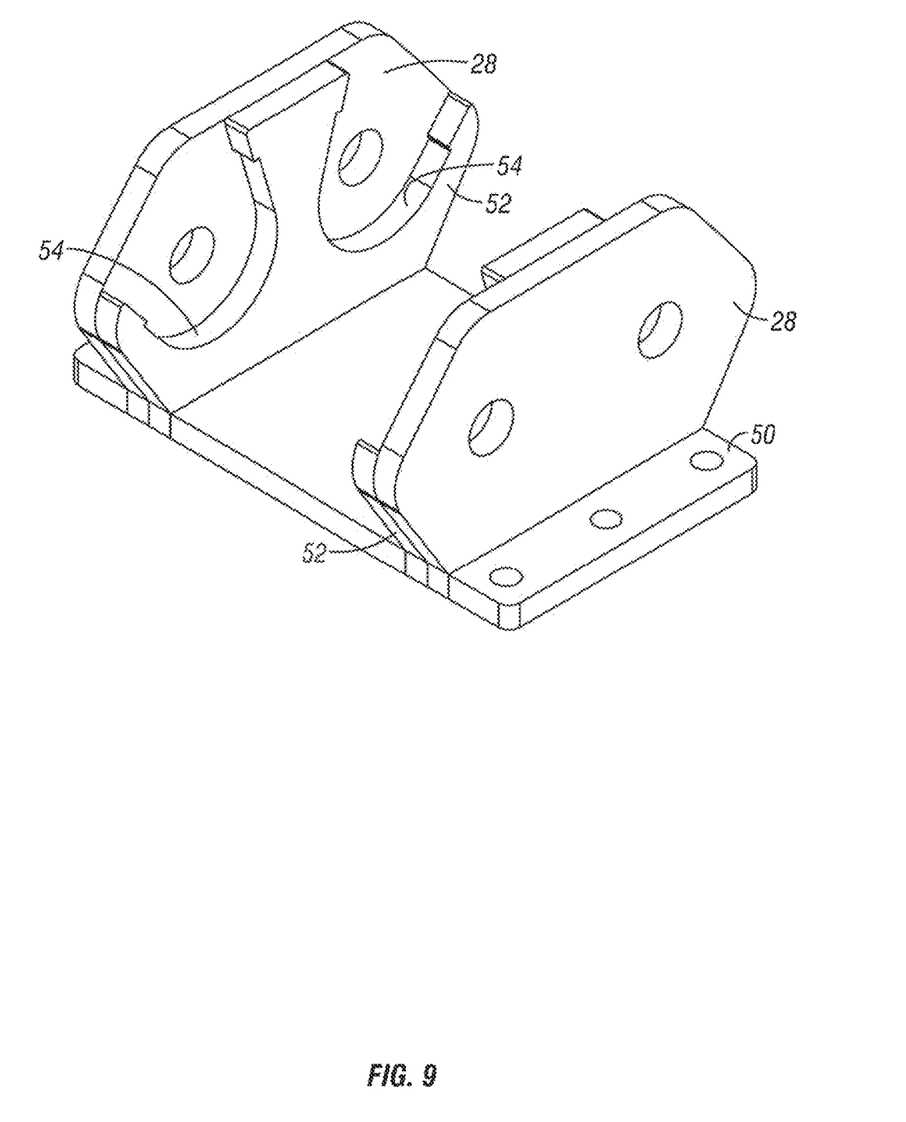
FIGS. 9 and 10 are perspective views of the base or mounting bracket of the latch assembly.
Figure 10:
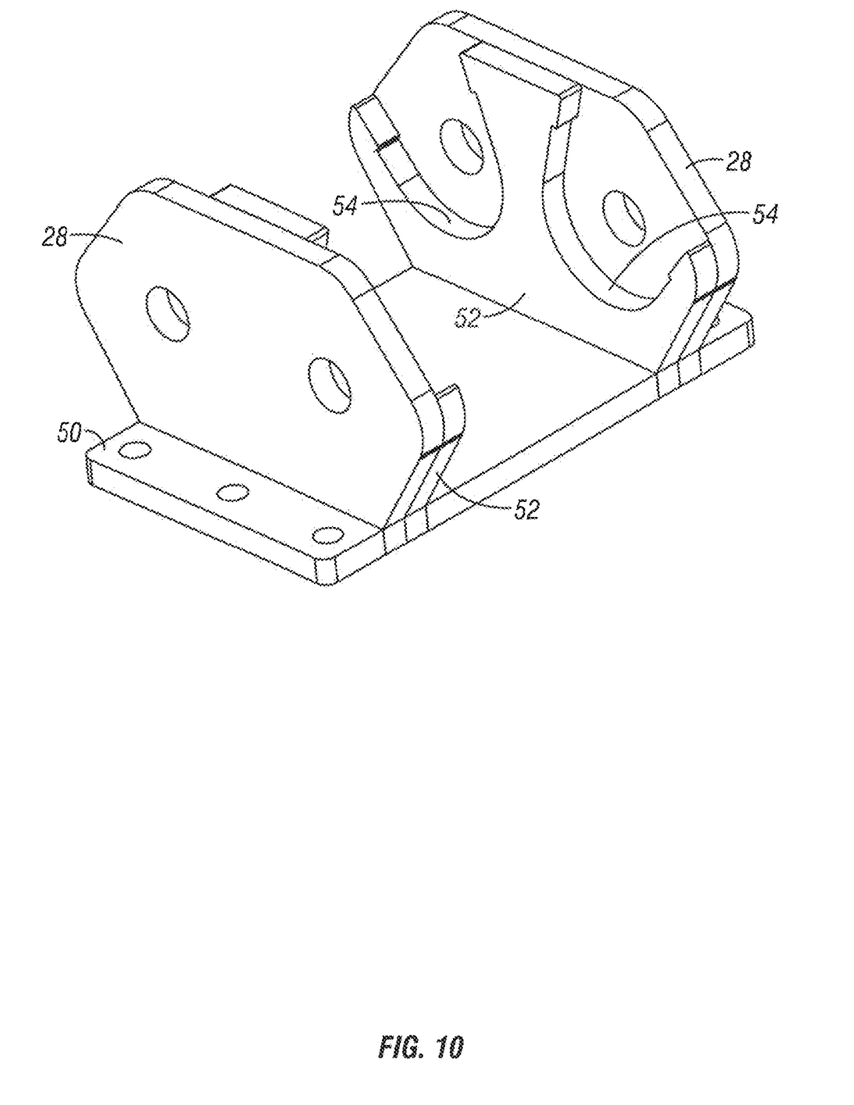
Figure 11:
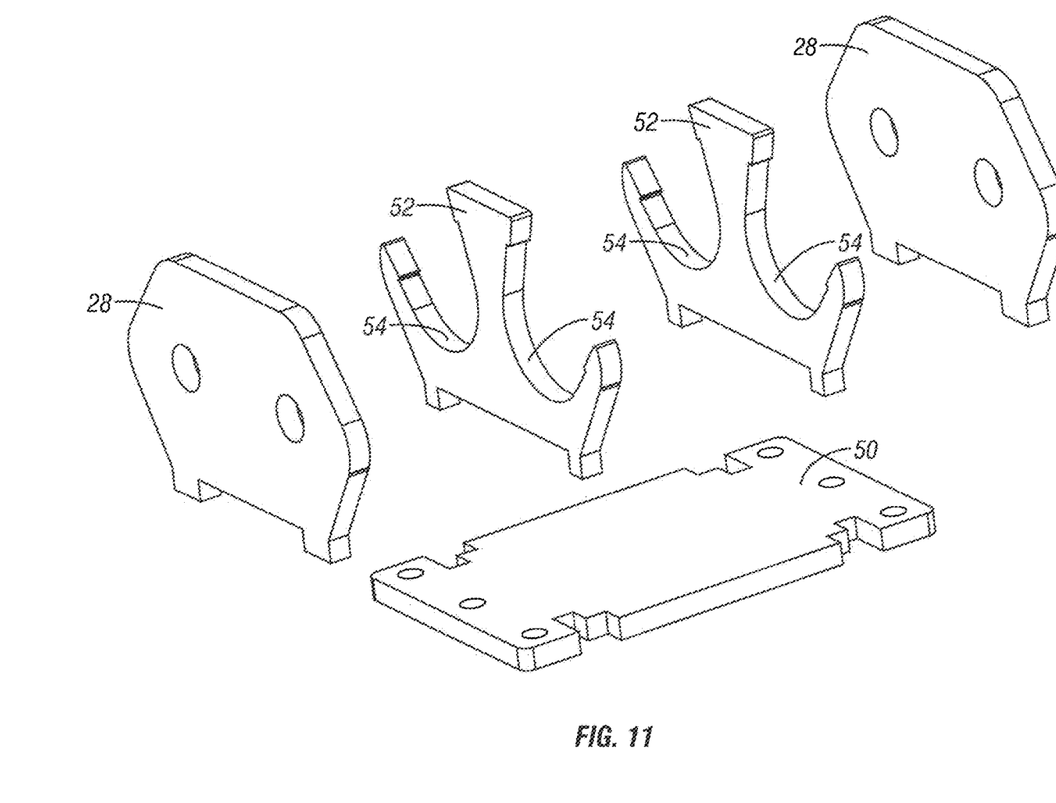
FIG. 11 is an exploded view of the base.

The mounting plates 28 for the latch arms 26 are connected by a base plate 50, as shown in FIGS. 9-11. Each plate 28 has an inner plate 52 welded thereto, with a pair of recesses 54 formed in each plate 52. The terminal ends 56 of the recesses form stop elements which retain the latch arms 26 in a raised position when the cylinder 36 is retracted to unlatch the wings 16. Since the cylinder 36 is not symmetrical or equally balanced at the center of the mounting plates 28, the inner plates 52 maintain the arms 26 substantially horizontal, as seen in FIG. 2, and prevent the arms 26 from dropping. Such lateral dropping of either arm 26 could preclude the associated latch arm 32 from disconnecting from the associated wing 16. Such drooping of either arm 26 could also interfere with latching of the folded wing. Thus, the arms 26 are stationary and support the pivotal latch arms 32.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A latch assembly for a folding toolbar having a longitudinally extending tongue, and opposite wings foldable between an extended use position extending substantially perpendicular to the tongue and a retracted transport position extending substantially parallel the tongue, the latch assembly comprising:
   a pair of catches, one catch being mounted on each wing;
   a pair of latches mounted on the tongue and extending in opposite lateral directions; and
   a single actuator operatively connected to both of the latches and extending laterally relative to the tongue so as to pivot the latches about axes parallel to the tongue between a latch position retentively engaging the catches to retain the wings in the transport position and an unlatch position disengaged from the catches to allow the wings to move to the use position.

2. The latch assembly of claim 1 wherein the actuator is a hydraulic cylinder extending between the latches.

3. The latch assembly of claim 2 wherein the hydraulic cylinder extends to move the latches to the latch position and retracts to move the latches to the unlatch position.

4. The latch assembly of claim 1 wherein each catch includes a hook for engagement by one of the latches.

5. The latch assembly of claim 1 wherein each latch includes a latch arm pivotal between the latch and unlatch positions.

6. The latch assembly of claim 5 wherein each latch further includes a support arm to pivotally support one of the latch arms.

7. The latch assembly of claim 6 wherein each support arm extends laterally relative to the tongue.

8. The latch assembly of claim 5 wherein each latch arm pivots about a horizontal axis.

9. The latch assembly of claim 5 wherein each latch arm extends laterally relative to the tongue.

10. The latch assembly of claim 9 wherein each latch arm pivots about a longitudinal axis.

11. The latch assembly of claim 1 wherein the actuator extends between the latches.

12. The latch assembly of claim 1 further comprising a bracket on the tongue to which the latches are mounted.

13. A method of latching and unlatching folding wings on a tool bar, comprising:
- folding the wings forwardly from a lateral use position to a longitudinal transport position;
- pivoting a pair of latches mounted on a tongue of the tool bar, and extending in opposite lateral directions relative to the tongue, about longitudinal axes from an unlatched position disengaging from the wings to a latched position engaging the wings so as to retain the wings in the transport position;
- pivoting the latches about the longitudinal axes from the latched position to the unlatched position to release the wings for rearward movement to the use positions; and
- the pivotal movement of the latches being accomplished with a single actuator connected to both latches.

14. The method of claim 13 wherein the latches are pivoted in unison between the latched and unlatched positions.

15. The method of claim 13 wherein the latches pivot in opposite directions between the latched and unlatched positions.

16. The method of claim 13 wherein the latches are pivoted by a linear actuator having opposite ends connected to the latches.

17. The method of claim 13 wherein the latches are moved hydraulically.

* * * * *